(12) United States Patent
Tang et al.

(10) Patent No.: US 12,502,997 B2
(45) Date of Patent: Dec. 23, 2025

(54) POWER SYSTEM OF ELECTRIC VEHICLE, CONTROLLER, AND ELECTRIC VEHICLE

(71) Applicant: Huawei Digital Power Technologies Co., Ltd., Shenzhen (CN)

(72) Inventors: Zhengyi Tang, Shenzhen (CN); Ying Li, Xi'an (CN); Zhongjie Li, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 66 days.

(21) Appl. No.: 18/651,981

(22) Filed: May 1, 2024

(65) Prior Publication Data
US 2024/0367541 A1  Nov. 7, 2024

(30) Foreign Application Priority Data
May 5, 2023 (CN) .......................... 202321071322.6

(51) Int. Cl.
*B60L 53/62* (2019.01)
*B60K 17/02* (2006.01)
*B60L 53/14* (2019.01)

(52) U.S. Cl.
CPC .............. *B60L 53/62* (2019.02); *B60K 17/02* (2013.01); *B60L 53/14* (2019.02); *B60L 2240/50* (2013.01); *B60L 2240/547* (2013.01)

(58) Field of Classification Search
None
See application file for complete search history.

(56) References Cited

U.S. PATENT DOCUMENTS

| | | | |
|---|---|---|---|
| 10,611,363 B2* | 4/2020 | Wang | B60W 30/18127 |
| 2005/0190524 A1* | 9/2005 | Yamamoto | B60K 23/08 |
| | | | 361/139 |
| 2009/0090574 A1* | 4/2009 | Kuno | B60L 53/14 |
| | | | 180/65.265 |
| 2010/0219794 A1* | 9/2010 | Sugimoto | H02J 7/0024 |
| | | | 320/128 |
| 2019/0143978 A1* | 5/2019 | Pandit | B60K 23/0808 |
| | | | 701/69 |
| 2020/0353823 A1 | 11/2020 | Eriksson et al. | |
| 2022/0216714 A1* | 7/2022 | Zhang | B60L 50/51 |

FOREIGN PATENT DOCUMENTS

| | | |
|---|---|---|
| CN | 113022344 A | 6/2021 |
| CN | 114734831 A | 7/2022 |
| CN | 114889473 A | 8/2022 |

* cited by examiner

*Primary Examiner* — Daniel L Greene
(74) *Attorney, Agent, or Firm* — Maier & Maier, PLLC

(57) ABSTRACT

A power system of an electric vehicle, a controller, and the electric vehicle. The power system includes two drive motors and two motor control units. The two drive motors are separately in transmission connection with wheels of the electric vehicle through two clutch apparatuses. Windings of the two drive motors and three-phase bridge arms of the two motor control units form two boost circuits. The two boost circuits are configured to charge a power battery of the electric vehicle by performing boost conversion on an output voltage of a charging pile. The two clutch apparatuses are configured to disconnect a connection between a drive motor corresponding to a boost circuit that is in an operating state and a wheel. The power system can reduce shake and noise in a boost charging process of the electric vehicle.

20 Claims, 7 Drawing Sheets

POWER SYSTEM OF ELECTRIC VEHICLE, CONTROLLER, AND ELECTRIC VEHICLE

CROSS-REFERENCE TO RELATED APPLICATIONS

This application claims priority to Chinese Patent Application No. 202321071322.6, filed on May 5, 2023, which is hereby incorporated by reference in its entirety.

TECHNICAL FIELD

The embodiments relate to the field of electric vehicle charging technologies and to a power system, a controller, and an electric vehicle.

BACKGROUND

With development and rapid popularization of electric vehicles, a charging technology of a power battery of the electric vehicle becomes increasingly important, and the charging technology needs to meet requirements of different users and adapt to and be compatible with different power batteries and different charging piles. When a voltage of a battery pack is high, that is, a highest output voltage of a charging pile is lower than the voltage of the battery pack, boost charging is used. In some solutions, a boost circuit with high power is provided to boost an output voltage of the charging pile and then charge the battery pack. This increases circuit costs. To resolve the foregoing problem, in the conventional technology, a boost circuit formed by a motor and a motor control unit can be used to charge a power battery. However, this solution has two problems: first, in a process of boost charging for the power battery, a current passes through a winding of a drive motor, so that a stator magnetic field is generated. The stator magnetic field interacts with a rotor magnetic field, and a torque may be generated. When charging ends, the torque is suddenly released. Consequently, an impact (or shake) that can be obviously perceived is generated. This affects driving experience. Secondly, the method can implement charging by using only a single-set motor. This reduces applicability of the circuit.

SUMMARY

The embodiments provide a power system, a controller, and an electric vehicle, to resolve problems of insufficient boost charging power of the electric vehicle and vibration and shake of the electric vehicle after boost charging of the electric vehicle ends.

According to a first aspect, the embodiments provide a power system of an electric vehicle. The power system includes two powertrains, each powertrain includes a clutch apparatus, a drive motor, and a motor control unit, the drive motor in each powertrain is in transmission connection with at least one wheel of the electric vehicle through the clutch apparatus, the drive motor and the motor control unit in each powertrain form a boost circuit, the boost circuit is configured to: receive power supplied by a charging pile and charge a power battery, and a maximum output voltage of the boost circuit in each powertrain is greater than a maximum output voltage of the charging pile. In response to that the maximum output voltage of the charging pile is less than the minimum charging voltage of the power battery, the power system controls at least one of two boost circuits to operate, and controls the clutch apparatus of the powertrain corresponding to the at least one operating boost circuit to disconnect the transmission connection between the drive motor and the at least one wheel.

In an implementation of the first aspect, each powertrain includes a transmission gear group, the transmission gear group is configured to be in transmission connection with the drive motor and the at least one wheel, and the clutch apparatus in each powertrain is configured to disconnect the transmission connection between the transmission gear group and the drive motor or the transmission connection between the transmission gear group and the at least one wheel.

In an implementation of the first aspect, the two boost circuits have same maximum operating power. When output power of the charging pile is less than or equal to the maximum operating power of the boost circuit, one boost circuit is in an operating state, the other boost circuit is in a disconnected state, and the boost circuit in the operating state is configured to charge the power battery after performing boost conversion on an output voltage of the charging pile. Alternatively, when output power of the charging pile is greater than the maximum operating power of the boost circuit and the output power of the charging pile is less than or equal to a sum of the maximum operating power of the two boost circuits, both the boost circuits are in an operating state, and the two boost circuits are configured to charge the power battery after performing boost conversion on an output voltage of the charging pile.

In an implementation of the first aspect, the two powertrains are respectively a first powertrain and a second powertrain. The first powertrain includes a first drive motor, a first motor control unit, and a first clutch apparatus. The second powertrain includes a second drive motor, a second motor control unit, and a second clutch apparatus. One end of each of three windings of the first drive motor is configured to connect to a bridge arm midpoint of each of three bridge arms of the first motor control unit, the end of each of the three windings of the first drive motor and one end of each of the three bridge arms of the first motor control unit form an input end of a first boost circuit, and two ends of each of the three bridge arms of the first motor control unit form an output end of the first boost circuit, and the input end of the first boost circuit is configured to receive power supplied by the charging pile. One end of each of three windings of the second drive motor is configured to connect to a bridge arm midpoint of each of three bridge arms of the second motor control unit, the end of each of the three windings of the second drive motor and one end of each of the three bridge arms of the second motor control unit form an input end of a second boost circuit, and two ends of each of the three bridge arms of the second motor control unit form an output end of the second boost circuit, and the input end of the second boost circuit is configured to receive power supplied by the charging pile.

The input ends of the first boost circuit and the second boost circuit are configured to connect to the charging pile, the output ends of the first boost circuit and the second boost circuit are configured to connect to the power battery, and maximum output power of the first boost circuit is less than maximum output power of the second boost circuit. In a process in which the electric vehicle performs boost charging on the power battery through the first boost circuit or the second boost circuit, because a current passes through a winding of a drive motor, a stator magnetic field is generated, and the stator magnetic field interacts with a rotor magnetic field, and a torque may be generated. When charging ends, the torque is suddenly released. Consequently, an impact (or shake) that can be obviously perceived is generated. This affects driving experience. When the first boost circuit or the second boost circuit is in the operating state, the clutch apparatus of the power system may disconnect the transmission connection between the corresponding drive motor and the wheel of the electric vehicle. In this way, when charging ends, a torque generated by the drive motor is not transferred to the wheel of the electric vehicle. Therefore, an impact (or shake) generated when boost charging of the electric vehicle ends can be avoided, and driving experience can be improved.

When the electric vehicle is connected to the charging pile to charge the power battery, the power system charges the power battery through the first boost circuit or the second boost circuit in response to that an output voltage of the charging pile is less than a minimum charging voltage of the power battery. The first boost circuit or the second boost circuit charges the power battery after performing boost conversion on the output voltage of the charging pile. The first clutch apparatus or the second clutch apparatus is configured to disconnect the transmission connection between the drive motor corresponding to the boost circuit that is in the operating state and the wheel.

In an implementation of the first aspect, in response to that output power of the charging pile is less than or equal to the maximum operating power of the first boost circuit, the power system charges the power battery through the first boost circuit. The first boost circuit is in an operating state, and the second boost circuit is in a disconnected state. The first clutch apparatus disconnects a transmission connection between the first drive motor and the wheel, and the first boost circuit is configured to perform boost conversion on an output voltage of the charging pile.

In an implementation of the first aspect, in response to that power of the charging pile is greater than output power of the first boost circuit and less than or equal to output power of the second boost circuit, the power system charges the power battery through the first boost circuit. The first boost circuit is in a disconnected state, and the second boost circuit is in an operating state. The second clutch apparatus disconnects the transmission connection between the second drive motor and the wheel, and the second boost circuit is configured to perform boost conversion on the output voltage of the charging pile.

In an implementation of the first aspect, in response to that the power of the charging pile is greater than the output power of the second boost circuit and the power of the charging pile is less than or equal to a sum of the output power of the first boost circuit and the output power of the second boost circuit, the power system charges the power battery through the first boost circuit and the second boost circuit. The first boost circuit is in an operating state, the second boost circuit is in an operating state, the first clutch apparatus is configured to disconnect a transmission connection between the first drive motor and the wheel, the second clutch apparatus is configured to disconnect a transmission connection between the second drive motor and the wheel, and the first boost circuit and the second boost circuit are configured to perform boost conversion on the output voltage of the charging pile.

In an implementation of the first aspect, the power system includes a first switch module and a second switch module, the output end of the first boost circuit is connected to the power battery through the first switch module, and the output end of the second boost circuit is connected to the power battery through the second switch module. The first switch module and the second switch module include two states: a turned-off state and a turned-on state, where when the first switch module is turned off, and the first boost circuit is in the disconnected state. When the first switch module is turned on, the first boost circuit is in an operating state. When the second switch module is turned off, the second boost circuit is in a disconnected state. When the second switch module is turned on, the second boost circuit is in an operating state.

According to a second aspect, the embodiments provide a controller for an electric vehicle. The electric vehicle includes two powertrains, each powertrain includes a clutch apparatus, a drive motor, and a motor control unit, the drive motor in each powertrain is in transmission connection with at least one wheel of the electric vehicle through the clutch apparatus, the drive motor and the motor control unit in each powertrain form a boost circuit, and the boost circuit is configured to: receive power supplied by a charging pile and charge a power battery through a switch module. In response to that a maximum output voltage of the charging pile is less than a minimum charging voltage of the power battery, the controller outputs a switch module control signal and a clutch apparatus control signal, where the switch module control signal is used to control at least one of two switch modules to be turned on, and the clutch apparatus control signal is used to control the clutch apparatus of the powertrain corresponding to the turned-on switch module to disconnect the transmission connection between the drive motor and the at least one wheel.

In an implementation of the second aspect, the two boost circuits have same maximum operating power. When output power of the charging pile is less than or equal to the maximum operating power of the boost circuit, the switch module control signal is used to control any switch module to be turned on, and the boost circuit corresponding to the turned-on switch module that is turned on is configured to charge the power battery after performing boost conversion on an output voltage of the charging pile. When output power of the charging pile is greater than the maximum operating power of the boost circuit and the output power of the charging pile is less than or equal to a sum of the maximum operating power of the two boost circuits, the switch module control signal is used to control the two switch modules to be turned on, and the two boost circuits are configured to charge the power battery after performing boost conversion on an output voltage of the charging pile.

In an implementation of the second aspect, the electric vehicle includes a first drive motor, a second drive motor, a first motor control unit, and a second motor control unit. The first drive motor is in transmission connection with a wheel of the electric vehicle through a first clutch apparatus, and the second drive motor is in transmission connection with a wheel of the electric vehicle through a second clutch apparatus. Three windings of the first drive motor and three bridge arms of the first motor control unit form a first boost circuit, and three windings of the second drive motor and three bridge arms of the second motor control unit form a second boost circuit. Maximum output power of the first boost circuit is less than or equal to maximum output power of the second boost circuit. Input ends of the first boost circuit and the second boost circuit are configured to connect to the charging pile, and output ends of the first boost circuit and the second boost circuit are separately connected to the power battery through the first switch module and the second switch module.

When the electric vehicle is connected to the charging pile to charge the power battery of the electric vehicle, in response to that the voltage of the charging pile is less than the voltage of the power battery, the controller outputs the switch module control signal and the clutch apparatus control signal. In response to that the switch module control signal controls the first switch module to be turned on, the clutch apparatus control signal is used to control the first clutch apparatus to disconnect the connection between the first drive motor and the wheel. In response to that the switch module control signal controls the second switch module to be turned on, the clutch apparatus control signal is used to control the second clutch apparatus to disconnect the connection between the second drive motor and the wheel.

The controller provided in the embodiments is configured to output the switch module control signal and the clutch apparatus control signal that cooperate with each other. When the electric vehicle is connected to the charging pile to charge the power battery, and if the electric vehicle performs boost charging on the power battery through the first boost circuit, the switch module control signal controls the first switch module to be turned on, the first boost circuit connects the charging pile to the power battery, and in this case, the clutch apparatus control signal controls the first clutch apparatus to disconnect the connection between the first drive motor and the wheel of the electric vehicle; or if the electric vehicle performs boost charging on the power battery through the second boost circuit, the switch module control signal controls the second switch module to be turned on, the first boost circuit connects the charging pile to the power battery, and in this case, the clutch apparatus control signal controls the second clutch apparatus to disconnect the connection between the second drive motor and the wheel of the electric vehicle. The controller provided in the embodiments outputs the switch module control signal and the clutch apparatus control signal, so that when the electric vehicle performs boost charging, the transmission connection between the drive motor and the wheel of the electric vehicle can be disconnected. Therefore, this can avoid vibration and shake of the electric vehicle caused by a torque generated by the drive motor after boost charging ends, and can improve comfort of the electric vehicle.

In an implementation of the second aspect, in response to that output power of the charging pile is less than or equal to the operating power of the first boost circuit, the controller controls the first switch module to be turned on and the second switch module to be turned off, and the controller controls the first clutch apparatus to disconnect the connection between the first drive motor and the wheel.

In an implementation of the second aspect, in response to that the output power of the charging pile is greater than the output power of the first boost circuit and less than or equal to the output power of the second boost circuit, the controller controls the second switch module to be turned on, controls the first switch module to be turned off, and controls the second clutch apparatus to disconnect the connection between the second drive motor and the wheel.

In an implementation of the second aspect, in response to that the output power of the charging pile is greater than the output power of the second boost circuit and the output power of the charging pile is less than or equal to a sum of the output power of the first boost circuit and the output power of the second boost circuit, the controller controls the first switch module and the second switch module to be turned on, controls the first clutch apparatus to disconnect the connection between the first drive motor and the wheel, and controls the second clutch apparatus to disconnect the connection between the second drive motor and the wheel.

The controller provided in the embodiments may output a switch module control signal and a clutch apparatus control signal based on a comparison result between the output power of the charging pile and the output power of the two boost circuits. The switch module control signal controls turning-on and turning-off of the first switch module or the second switch module, so that the first boost circuit or the second boost circuit performs boost conversion on the output voltage of the charging pile. Therefore, a boost amplitude of boost charging is increased and charging efficiency is improved. The clutch apparatus control signal controls the clutch apparatus to disconnect the transmission connection between the drive motor and the wheel, to eliminate impact of a torque generated by the drive motor on the wheel of the electric vehicle after the boost charging ends.

According to a third aspect, the embodiments provide an electric vehicle, where the electric vehicle includes the power system according to the first aspect or the controller according to the second aspect.

The electric vehicle provided in the third aspect of the embodiments can have a beneficial effect of the power system provided in the first aspect of the embodiments or beneficial effect of the controller provided in the second aspect of the embodiments. Details are not described herein again.

DETAILED DESCRIPTION OF EMBODIMENTS

The following describes solutions in specific implementations of the embodiments with reference to accompanying drawings in the implementations. Before specific content of the solutions is described, terms used are first briefly described.

The words "first, second, third, or the like" or similar terms such as module A, module B, and module C are only used to distinguish between similar objects, and do not represent a specific order for objects. It can be understood that a specific order or sequence may be exchanged if allowed, so that embodiments described herein can be implemented in an order other than that illustrated or described herein.

The term "include" should not be construed as being limited to the content listed below; and the term does not exclude other elements or steps. Accordingly, it should be interpreted as specifying the presence of the feature, entirety, step or component mentioned, but does not preclude the presence or addition of one or more other features, entireties, steps or components and groups thereof. Therefore, the expression "device including apparatuses A and B" should not be limited to device consisting of only components A and B.

"One embodiment" or "an embodiment" means that a specific feature, structure, or characteristic described in combination with this embodiment is included in at least one embodiment. Therefore, the term "in one embodiment" or "in an embodiment" does not necessarily refer to a same embodiment, but may refer to a same embodiment. Further, in one or more embodiments, the particular features, structures, or characteristics can be combined in any suitable manner, as will be apparent to those of ordinary skill in the art from the descriptions.

Unless otherwise defined, all technical and scientific terms have same meanings as those as understood by a person skilled in the art. In case of any inconsistency, the meaning described herein or the meaning obtained based on the content recorded herein shall be used. In addition, the terms used herein are merely for the purpose of describing embodiments, but are not intended as limiting.

Figure 1:
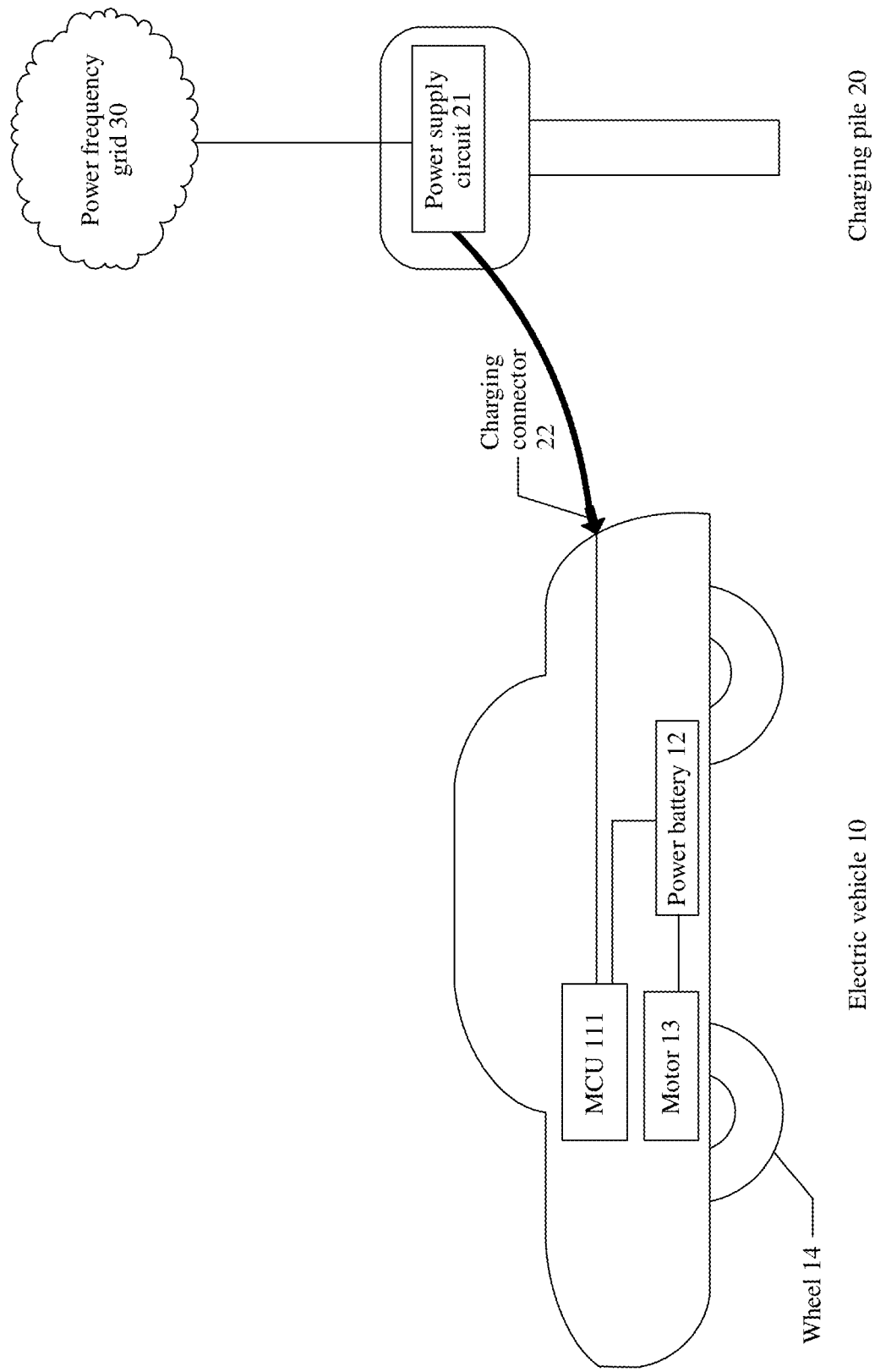
FIG. 1 is a schematic diagram of an electric vehicle and a charging pile.

An electric vehicle, which may also be referred to as a new energy vehicle, is a vehicle driven by electric energy. As shown in FIG. 1, an electric vehicle 10 can include a power battery 12, a drive motor 13, and wheels 14. The power battery 12 is a battery with large capacity and high power. When the electric vehicle 10 travels, the power battery 12 may provide power to the drive motor 13 through a motor control unit (MCU) 111. The drive motor 13 converts electric energy provided by the power battery 12 into mechanical energy, to drive the wheels 14 to rotate, so that the vehicle travels.

Figure 2:
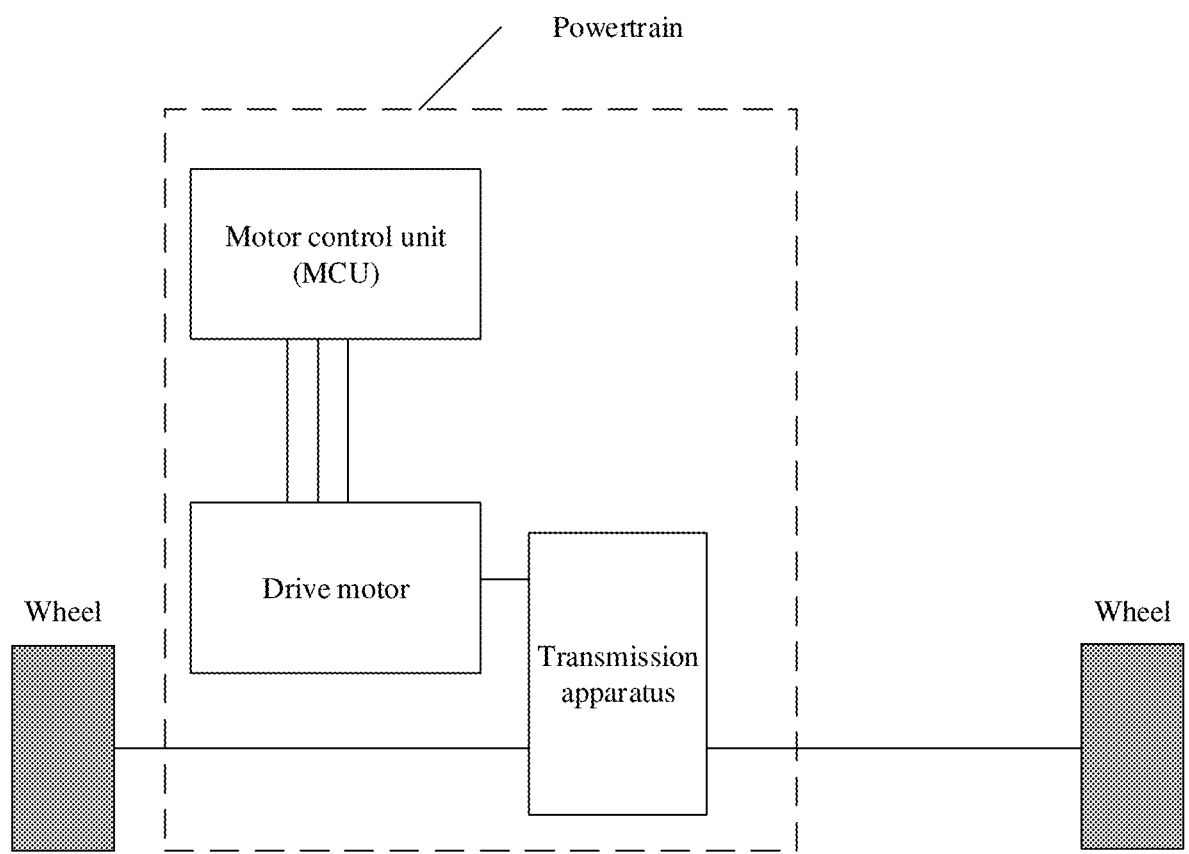
FIG. 2 is a schematic diagram of a power system of an electric vehicle.

FIG. 2 is a schematic diagram of a structure of a power system of a vehicle. The power system includes a powertrain and wheels. The following further describes each module or component.

The powertrain includes a motor control unit, a drive motor, and a transmission apparatus. The motor control unit (MCU) has a connection relationship with the drive motor, the drive motor has a connection relationship with the transmission apparatus, and the transmission apparatus has a connection relationship with the wheel.

The drive motor is an apparatus that converts electric energy into mechanical energy, and can output a torque and a rotation speed, to provide power for traveling of the vehicle. In this embodiment, to meet a direct current fast charging requirement of the vehicle, boost charging is performed on the power battery by using the drive motor. This may also be referred to as that boost charging is performed on the power battery by reusing the powertrain of the vehicle.

The transmission apparatus is an apparatus configured to change the torque and the rotation speed from the drive motor. The transmission apparatus includes a clutch apparatus and a transmission gear group. When the electric vehicle 10 is in a traveling state, the rotation speed and the torque that are output by the drive motor are output to the wheel through the transmission apparatus. An operating state of the clutch apparatus includes an engaged state and a disengaged state. When the clutch apparatus is in the engaged state, the rotation speed and the torque that are output by the drive motor are output to the wheel through the clutch apparatus and the transmission gear group. When the clutch apparatus is in the disengaged state, a transmission connection between the drive motor and the wheel is disconnected, and the rotation speed and the torque that are output by the drive motor cannot be output to the wheel.

The wheel is a rigid wheel that fastens an inner edge of a tire, supports the tire, and bears load together with the tire. Alternatively, a tire, a rim, and a spoke combined together may be collectively referred to as a wheel. A wheel assembly includes two parts: a wheel and a tire. There is a connection relationship between the wheel and an output shaft of the clutch apparatus. For example, a shaft that connects the clutch apparatus to the wheel (which is also referred to as a drive wheel) may be referred to as a half shaft, or may be referred to as a drive shaft. The wheel receives, through the half shaft, the torque and the rotation speed that are input by the clutch apparatus, to generate motion. It may be understood that the motion of the wheel is affected by the torque and the rotation speed that are input by the clutch apparatus. It should be noted that, when the clutch apparatus is in a neutral gear, the clutch apparatus does not input a torque and a rotation speed to the wheel anymore.

It should be noted that the modules shown in FIG. 2 are only examples. In an actual application scenario, the power system may further include more or fewer modules or components. This is not limited.

When the electric vehicle 10 is charged, a charging pile 20 may be used to charge the electric vehicle 10. As shown in FIG. 1, the charging pile 20 can include a power supply circuit 21 and a charging connector 22. One end of the power supply circuit 21 is connected to a power frequency grid 30, and the other end is connected to the charging connector 22 through a cable. Currently, most charging piles 20 are direct current charging piles, and the power supply circuit 21 may convert an alternating current provided by the power frequency grid 30 into a direct current. Operating personnel may insert the charging connector 22 into a charging socket of the electric vehicle 10, so that the charging connector 22 is connected to the power battery 12 in the electric vehicle 10, and then the power supply circuit 21 of the charging pile 20 can charge the power battery 12 through the charging connector 22.

An output voltage of the charging pile 20 may be understood as a power supply voltage received by the electric vehicle 10. In a direct current fast charging scenario, the power supply voltage received by the electric vehicle 10 falls within a charging voltage range of the power battery 12, and the power battery 12 can directly use the output voltage of the charging pile 20 to complete charging.

A lower limit of the charging voltage range of the power battery 12 is a minimum charging voltage, and the minimum charging voltage may be understood as a minimum charging voltage value that can be adapted to the power battery 12. An upper limit of the charging voltage range of the power battery 12 is a maximum charging voltage, and the maximum charging voltage may be understood as a maximum charging voltage value that can be adapted to the power battery 12.

Currently, to improve a charging speed of the electric vehicle 10, a voltage level of the power battery 12 gradually increases from current 500 V to 800 V. The power battery 12 with a voltage level of 800 V is used as an example, a battery voltage of the power battery 12 may reach 800 V, and a required charging voltage may not be lower than 800 V. However, for a current charging pile 20 that supports direct current fast charging in the market, a voltage level of the charging pile 20 is generally 500 V, that is, a maximum output voltage of most charging piles 20 that support direct current fast charging is 500 V. As a result, many electric vehicles 10 equipped with a high-voltage power battery face a difficulty of being charged.

Figure 3:
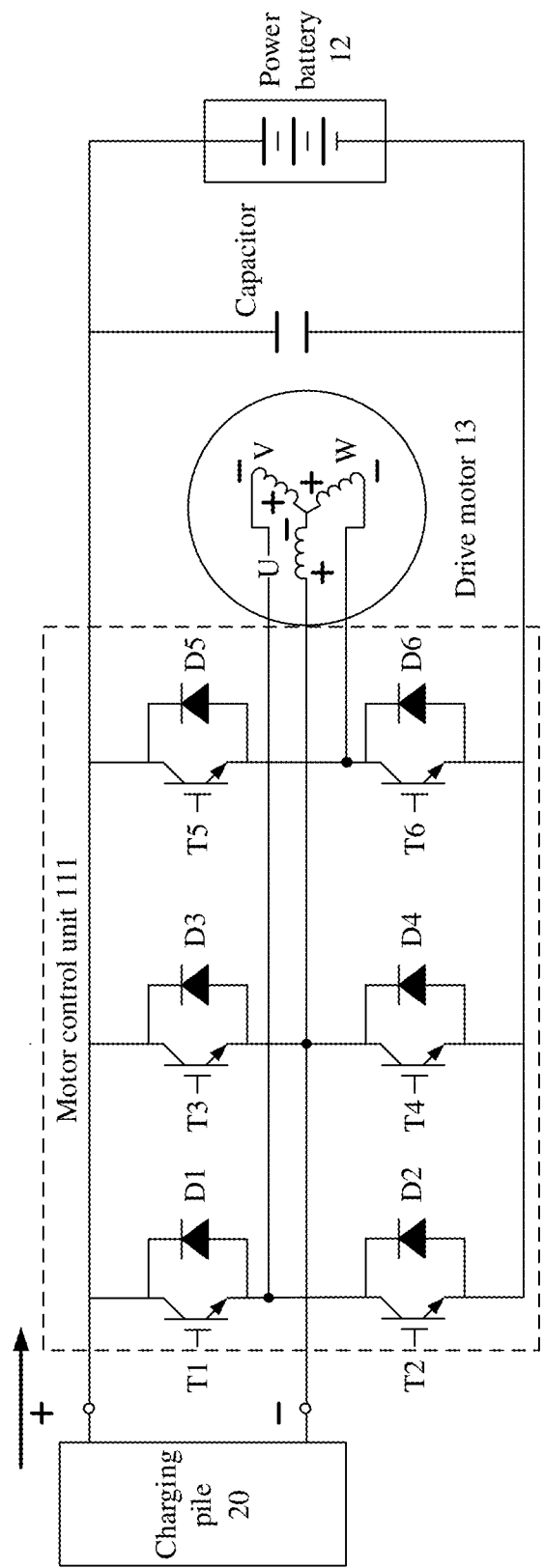
FIG. 3 is a schematic diagram of a boost charging circuit of an electric vehicle.

Refer to FIG. 3. FIG. 3 is a schematic diagram of a structure of a boost charging circuit. The boost charging circuit includes a motor control unit 111 and a drive motor 13. The drive motor 13 is a permanent-magnet synchronous motor, and a connection manner of three phase windings of the drive motor 13 is that two phase windings are connected in parallel and then are separately connected in series to another phase winding. For example, a V phase winding and a W phase winding are connected in parallel and then are separately connected in series to a U phase winding. Therefore, the boost charging circuit may be referred to as a two-parallel and one-series boost charging circuit. A positive electrode of the charging pile 20 is connected to a positive end of a three-phase bridge arm, and a negative electrode of the charging pile 20 is connected to a lead-out cable of a series phase winding (for example, the U phase winding) of the drive motor 13. In the three-phase bridge arm, a transistor T1, a diode D1, a transistor T2, and a diode D2 form a one-phase bridge arm, the transistor T1 is connected in parallel to the diode D1, and the transistor T2 is connected in parallel to the diode D2. A transistor T3, a diode D3, a transistor T4, and a diode D4 form a one-phase bridge arm, the transistor T3 is connected in parallel to the diode D3, and the transistor T4 is connected in parallel to the diode D4. A transistor T5, a diode D5, a transistor T6, and a diode D6 form a one-phase bridge arm, the transistor T5 is connected in parallel to the diode D5, and the transistor T6 is connected in parallel to the diode D6.

As shown in FIG. 3, in a charging stage of the power battery 12, the diode D2 and the diode D6 are conducted, and other transistors and diodes are cut off. The drive motor 13 is configured to charge the power battery 12 after boosting an output voltage of the charging pile 20. An arrow shown in the figure is a current direction. A current flowing out from the U phase winding of the drive motor 13 flows into the negative electrode of the charging pile 20, and then flows out from the positive electrode of the charging pile 20. The current flowing out from the positive electrode of the charging pile 20 flows into the power battery 12. After flowing out from the power battery 12, a current is divided into two paths. One path flows into the V phase winding of the drive motor 13 through the diode D2, and the other path flows into the W phase winding of the drive motor 13 through the diode D6. A current flowing out from the V phase winding of the drive motor 13 and a current flowing out from the W phase winding of the drive motor are combined into one channel and then flow into the U phase winding of the drive motor. In this way, a closed loop is formed, and boost charging is performed on the power battery 12 by using the drive motor 13.

However, when charging is performed based on the foregoing described boost charging solution, a stator magnetic vector of the drive motor 13 is not zero. During charging, an electric vehicle is in a static state, and a rotor location of the drive motor 13 is random. When a direct axis of the drive motor 13 does not overlap the stator magnetic vector, a locked-rotor torque is generated. When charging ends, the torque is suddenly released. Consequently, an impact (or shake) that can be obviously perceived is generated. This affects driving experience, and affects safety and reliability of a vehicle brake system to some extent. In addition, with development of electric vehicles toward a higher voltage, it may be difficult to meet a high-voltage charging requirement of a power battery through only one boost circuit. In addition, currently, a large quantity of electric vehicles increase driving force of the electric vehicles in a dual-motor arrangement manner. To resolve the foregoing problem, embodiments provide a power system and a controller that are used in an electric vehicle.

Figure 4:
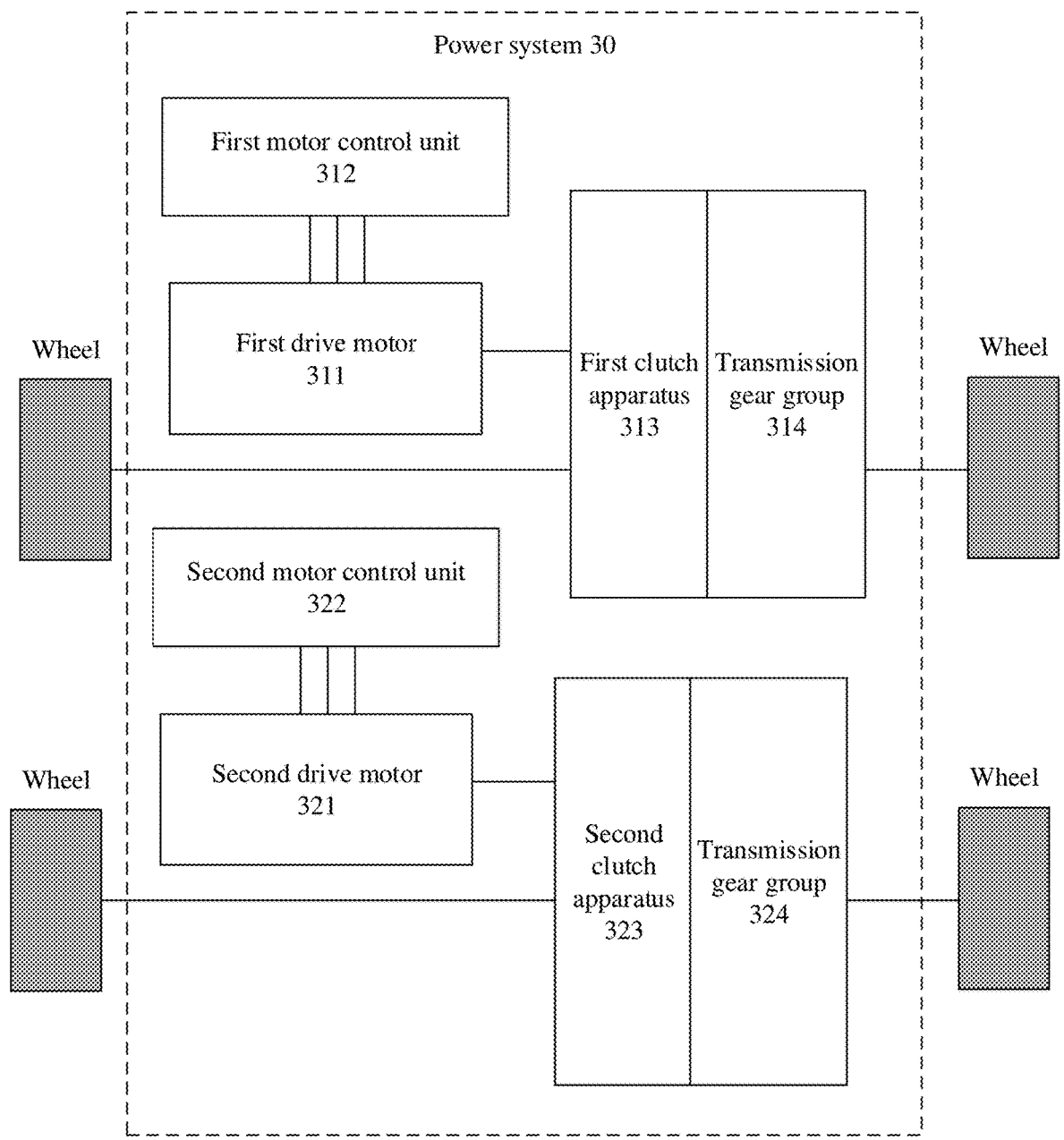
FIG. 4 is a schematic diagram of a power system according to an embodiment.

FIG. 4 is a schematic diagram of a power system 30 according to an embodiment. As shown in FIG. 4, the power system 30 includes a first powertrain 31 and a second powertrain 32. The first powertrain includes a first drive motor 311, a first motor control unit 312, a first clutch apparatus 313, and a transmission gear group 314. The second powertrain includes a second drive motor 321, a second motor control unit 322, a second clutch apparatus 323, and a transmission gear group 324. The first drive motor 311 is in transmission connection with a wheel 14 of an electric vehicle 10 through the first clutch apparatus 313 and the transmission gear group 314. The second drive motor 321 is in transmission connection with a wheel 14 of the electric vehicle 10 through the second clutch apparatus 323 and the transmission gear group 324.

An output shaft of the first drive motor 311 provided in this embodiment is configured to connect to an input shaft of the first clutch apparatus 313, and an output shaft of the first clutch apparatus 313 is configured to connect to an input shaft of the transmission gear group 314. An output shaft of the drive motor 321 is configured to connect to an input shaft of the second clutch apparatus 323, and an output shaft of the second clutch apparatus 323 is configured to connect to an input shaft of the transmission gear group 324. An operating state of the first clutch apparatus 313 and the second clutch apparatus 323 includes an engaged state and a disengaged state. When the first clutch apparatus 313 is in the engaged state, a rotation speed or a torque output by the first drive motor 311 is transferred to the wheel 14 through the first clutch apparatus 313 and the transmission gear group 314. When the first clutch apparatus 313 is in the disengaged state, a transmission connection between the first drive motor 311 and the wheel 14 is disconnected. When the second clutch apparatus 323 is in the engaged state, a rotation speed or a torque output by the second drive motor 321 is transferred to the wheel 14 through the second clutch apparatus 323 and the transmission gear group 324. When the second clutch apparatus 323 is in the disengaged state, a transmission connection between the second drive motor 321 and the wheel 14 is disconnected. The first clutch apparatus 313 and the second clutch apparatus 323 provided in this embodiment may be a one-way clutch or a two-way clutch.

Figure 5:
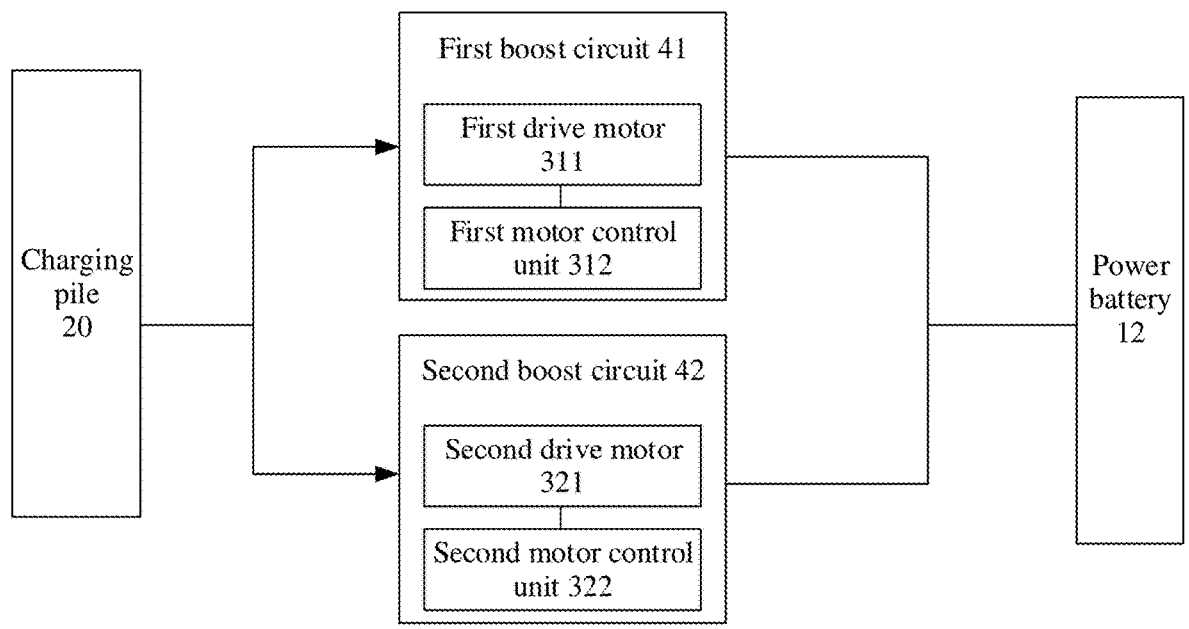
FIG. 5 is a schematic diagram of a boost circuit according to an embodiment.

FIG. 5 is a schematic diagram of a first boost circuit 41 and a second boost circuit 42 according to an embodiment. As shown in FIG. 5, windings of a first drive motor 311 and a bridge arm of a first motor control unit 312 form the first boost circuit 41, and windings of a second drive motor 321 and a bridge arm of a second motor control unit 322 form the second boost circuit 42. Input ends of the first boost circuit 41 and the second boost circuit 42 are configured to connect to a charging pile 20, output ends of the first boost circuit 41 and the second boost circuit 42 are connected to a power battery 12, and the first boost circuit 41 and the second boost circuit 42 are configured to receive power supplied by the charging pile 20 and charge the power battery 12.

Figure 6:
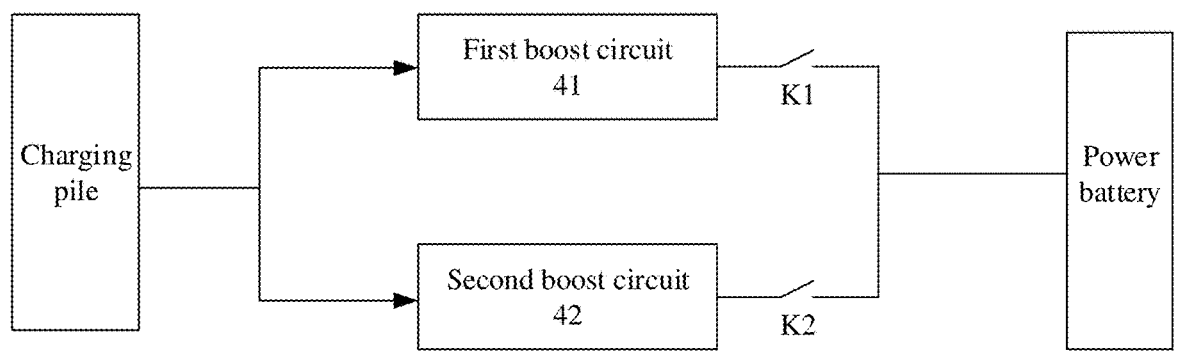
FIG. 6 is a schematic diagram of another boost circuit according to an embodiment.

As shown in FIG. 6, a power system 30 includes a switch module K1 and a switch module K2. An output end of a first boost circuit 41 is connected to a power battery 12 through the first switch module K1, and an output end of a second boost circuit 42 is connected to the power battery 12 through the second switch module K2. When the first switch module K1 is turned off, the first boost circuit 41 is in a disconnected state. When the first switch module K1 is turned on, the first boost circuit 41 is in an operating state. When the second switch module K2 is turned off, the second boost circuit 42 is in a disconnected state. When the second switch module K2 is turned on, the second boost circuit 42 is in an operating state.

That the first boost circuit 41 is in the operating state means that when the electric vehicle 10 is connected to a charging pile 20 to charge the power battery 12, the first boost circuit 41 is connected. In other words, a direct current from the charging pile 20 is input to the power battery 12 through the first boost circuit 41. Similarly, that the second boost circuit 42 is in the operating state means that when the electric vehicle 10 is connected to the charging pile 20 to charge the power battery 12, the second boost circuit 42 is connected. In other words, a direct current from the charging pile 20 is input to the power battery 12 through the second boost circuit 42. That the first boost circuit 41 is in the disconnected state means that a direct current from the charging pile 20 is not input to the power battery 12 through the first boost circuit 41, and that the second boost circuit 42 is in the disconnected state means that a direct current from the charging pile 20 is not input to the power battery 12 through the second boost circuit 42.

In response to that a maximum output voltage of the charging pile 20 is less than a minimum charging voltage of the power battery 12, the power system 30 controls at least one of the two boost circuits to operate, and the power system 30 controls a clutch apparatus of a powertrain corresponding to the at least one operating boost circuit to disconnect a transmission connection between a drive motor and at least one wheel 14.

For example, when the first boost circuit 41 is in the operating state, and the second boost circuit 42 is in the disconnected state, the first boost circuit 41 performs boost conversion on a voltage of the charging pile, and a first clutch apparatus 313 disconnects a transmission connection between a first drive motor 311 and a wheel 14.

For example, when the second boost circuit 42 is in the operating state, and the first boost circuit 41 is in the disconnected state, the second boost circuit 42 performs boost conversion on a voltage of the charging pile, and a second clutch apparatus 323 disconnects a transmission connection between a second drive motor 321 and a wheel 14.

For example, when the first boost circuit is in the operating state, and the second boost circuit is in the operating state, the first boost circuit and the second boost circuit perform boost conversion on a voltage of the charging pile, the first clutch apparatus 313 disconnects a transmission connection between the first drive motor 311 and a wheel 14, and the second clutch apparatus 323 disconnects the transmission connection between the second drive motor 321 and a wheel 14.

In a process in which the electric vehicle performs boost charging on the power battery 12 through the first boost circuit 41 or the second boost circuit 42, correspondingly, a current passes through windings of the first drive motor 311 or the second drive motor 321, so that a stator magnetic field is generated. The stator magnetic field interacts with a rotor magnetic field, and a torque may be generated. When charging ends, the torque is suddenly released. Consequently, an impact (or shake) that can be obviously perceived is generated. This affects driving experience. When the first boost circuit 41 or the second boost circuit 42 is in a connected state, the first clutch apparatus 313 or the second clutch apparatus 323 of the power system 30 provided in the embodiments may disconnect the transmission connection between the corresponding drive motor and the wheel 14 of the electric vehicle 10. In this way, when charging ends, a torque generated by the first drive motor 311 or the second drive motor 321 is not transferred to the wheel 14 of the electric vehicle 10. Therefore, an impact generated when boost charging of the electric vehicle 10 ends can be avoided, and driving experience can be improved.

Figure 7:
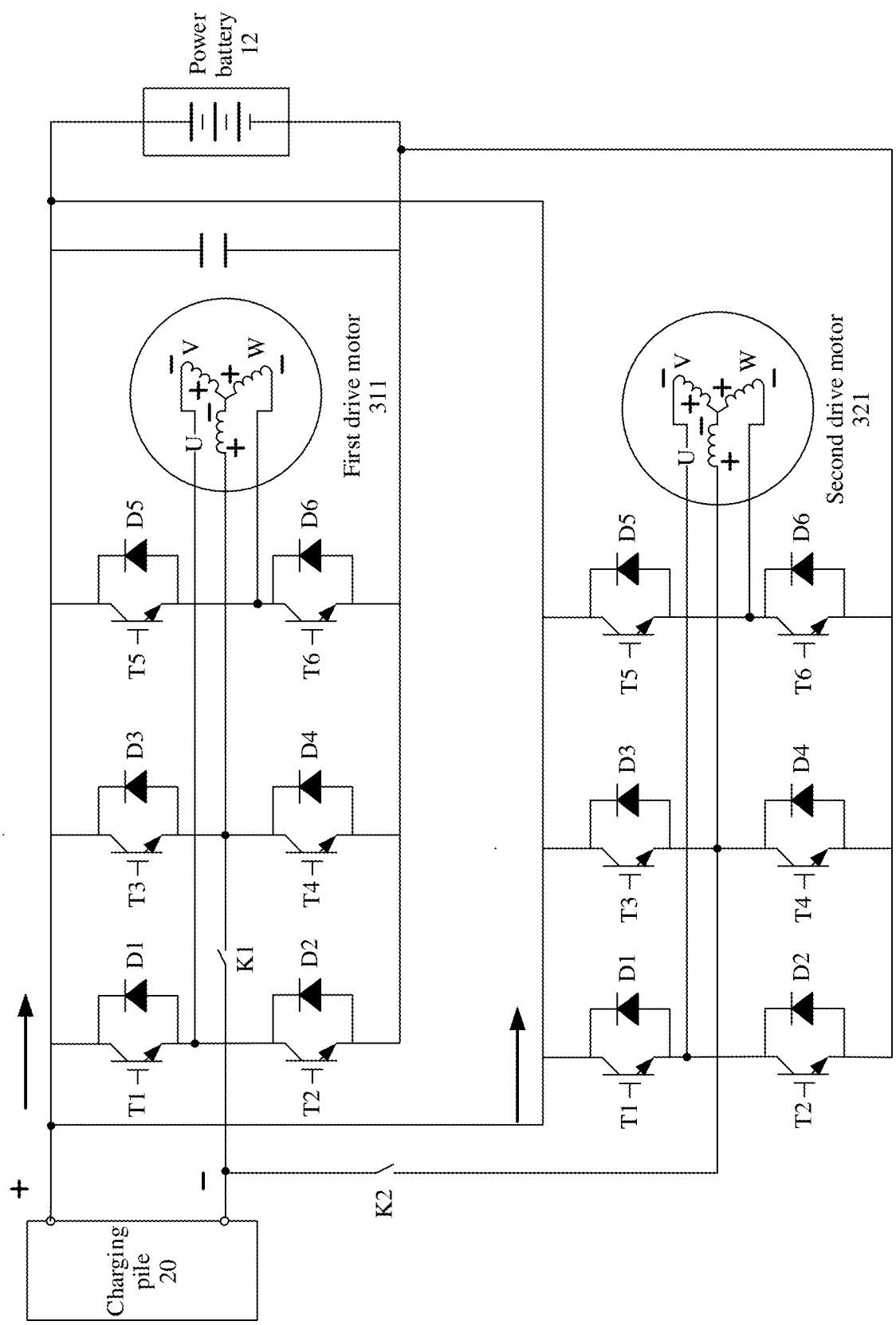
FIG. 7 is a schematic diagram of a topology of a boost circuit according to an embodiment.

FIG. 7 is a schematic diagram of circuit topologies of a first boost circuit 41 and a second boost circuit 42 according to an embodiment. As shown in FIG. 7, one end of each of three windings of a first drive motor 311 is configured to connect to a bridge arm midpoint of each of three bridge arms of a first motor control unit 312, another end of each of the three windings of the first drive motor 311 and one end of each of the three bridge arms of the first motor control unit 312 form an input end of the first boost circuit 41, and two ends of each of the three bridge arms of the first motor control unit 312 form an output end of the first boost circuit 41. The input end of the first boost circuit 41 is configured to connect to a charging pile through a switch module K1, and the output end of the first boost circuit 41 is configured to connect to a power battery 12.

One end of each of the three windings of the second drive motor 321 is configured to connect to a bridge arm midpoint of each of three bridge arms of a second motor control unit 322, another end of each of the three windings of the second drive motor 321 and one end of each of the three bridge arms of the second motor control unit 322 form an input end of the second boost circuit 42, and two ends of each of the three bridge arms of the second motor control unit 322 form an output end of the second boost circuit 42. The input end of the second boost circuit 42 is configured to connect to the charging pile 20 through a switch module K2, and the output end of the second boost circuit 42 is configured to connect to the power battery 12.

In the power system 30 provided in this embodiment, the windings of the two drive motors and the three-phase bridge arms of the two motor control units are reused to form the first boost circuit 41 and the second boost circuit 42, and no separate boost module needs to be disposed. This reduces a quantity of electronic components of an electric vehicle and reduces costs.

In an embodiment, maximum operating power of the first boost circuit 41 is the same as that of the second boost circuit 42. When output power of the charging pile 20 is less than or equal to the maximum operating power of the first boost circuit 41 or the second boost circuit 42, one boost circuit is in an operating state, other boost circuit is in a disconnected state, and the boost circuit in the operating state is configured to perform boost conversion on an output voltage of the charging pile 20 to charge the power battery 12. When output power of the charging pile 20 is greater than the maximum operating power of the first boost circuit 41 or the second boost circuit 42, and the output power of the charging pile is less than or equal to a sum of the maximum operating power of the first boost circuit 41 and the maximum operating power of the second boost circuit 42, both the two boost circuits are in the operating state, and the two boost circuits are configured to perform boost conversion on an output voltage of the charging pile 20 to charge the power battery 12.

In an embodiment, maximum operating power of the first boost circuit 41 is less than maximum operating power of the second boost circuit 42. In response to that output power of the charging pile 20 is less than or equal to the maximum operating power of the first boost circuit 41, the power system 30 charges the power battery 12 through the first boost circuit 41. When the first switch module K1 is turned on, the first boost circuit 41 is in the connected state. When the second switch module K2 is turned off, the second boost circuit 42 is in the disconnected state. The first clutch apparatus 313 disconnects a transmission connection between the first drive motor 311 and the wheel 14, and the first boost circuit 41 is configured to perform boost conversion on an output voltage of the charging pile 20.

In response to that output power of the charging pile is greater than the maximum operating power of the first boost circuit 41 and the output power of the charging pile is less than or equal to the maximum operating power of the second boost circuit 42, the power system 30 charges the power battery 12 through the second boost circuit 42. For example, when the first switch module K1 is turned off, the first boost circuit 41 is in the disconnected state; and when the second switch module K2 is turned on, the second boost circuit 42 is in the connected state. The second clutch apparatus 323 disconnects a transmission connection between the second drive motor 321 and the wheel 14, and the second boost circuit 42 is configured to perform boost conversion on an output voltage of the charging pile 20.

In response to that the output power of the charging pile is greater than the maximum operating power of the second boost circuit 42 and the output power of the charging pile is less than or equal to a sum of the maximum operating power of the first boost circuit 41 and the maximum operating power of the second boost circuit 42, the power system 30 charges the power battery 12 through the first boost circuit 41 and the second boost circuit 42. When the first switch module K1 is turned on, the first boost circuit 41 is the connected state. When the second switch module K2 is turned on, the second boost circuit 42 is in the connected state. The first clutch apparatus 312 is configured to disconnect the transmission connection between the first drive motor 311 and the wheel 14, the second clutch apparatus 323 is configured to disconnect the transmission connection between the second drive motor 321 and the wheel 14, and the first boost circuit 41 and the second boost circuit 42 are jointly configured to perform boost conversion on the output voltage of the charging pile 20.

The power system 30 provided in this embodiment may select, based on the output power of the charging pile 20, a proper boost circuit to perform boost charging on the power battery 12, and disconnect a connection between a drive motor corresponding to the boost circuit in the connected state and the wheel 14, to avoid an impact of a torque generated by the first drive motor 311 or the second drive motor 321 on the electric vehicle in a boost charging process. The power system 30 provided in this embodiment improves comfort of the electric vehicle.

Figure 8:
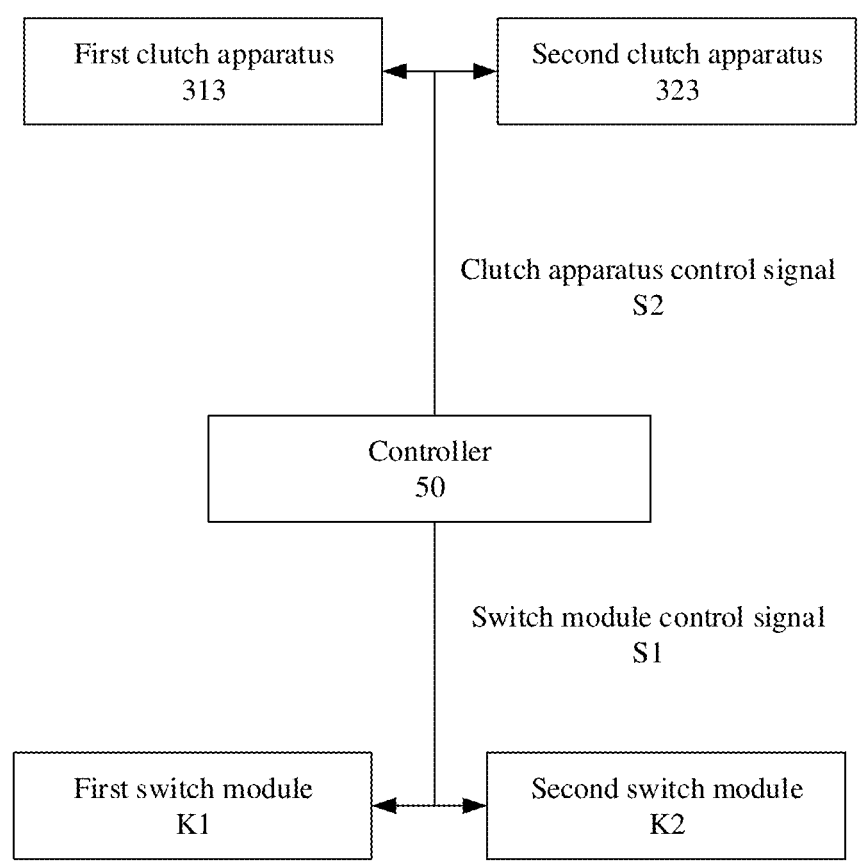
FIG. 8 is a schematic diagram of a controller according to an embodiment.

Refer to FIG. 8. FIG. 8 is a schematic diagram of a controller 50 according to an embodiment. The controller 50 is configured to control an operation mode of a first boost circuit 41 and a second boost circuit 42. When an electric vehicle 10 is connected to a charging pile 20 to charge a power battery 12, in response to that an output voltage of the charging pile 20 is less than a minimum charging voltage of the power battery, the controller 50 outputs a switch module control signal S1 and a clutch apparatus control signal S2. The switch module control signal S1 is used to control a first switch module K1 or a second switch module K2 to be turned on. The clutch apparatus control signal S2 is used to control a clutch apparatus of a powertrain corresponding to the turned-on switch module to disconnect a transmission connection between a drive motor and at least one wheel 14.

For example, in response to that the switch module control signal S1 controls the first switch module K1 to be turned on, the clutch apparatus control signal S2 is used to control a first clutch apparatus 312 to disconnect a transmission connection between a first drive motor 311 and a wheel 14. In response to that the switch module control signal S1 controls the second switch module K2 to be turned on, the clutch apparatus control signal S2 is used to control a second clutch apparatus 323 to disconnect a transmission connection between a second drive motor 321 and a wheel 14.

When the output voltage of the charging pile 20 is less than the minimum charging voltage of the power battery, the first boost circuit 41 or the second boost circuit 42 charges the power battery 12 after performing boost conversion on the output voltage of the charging pile 20, to match a charging voltage of the power battery 12. The controller 50 provided in this embodiment is configured to output the switch module control signal S1 and the clutch apparatus control signal S2 that match with each other. When the electric vehicle 10 is connected to the charging pile 20 to charge the power battery 12, and if the electric vehicle 10 performs boost charging on the power battery 12 through the first boost circuit 41, the switch module control signal S1 controls the first switch module K1 to be turned on, the first boost circuit 41 connects the charging pile 20 to the power battery 12, and in this case, the clutch apparatus control signal S2 controls the first clutch apparatus 312 to disconnect the connection between the first drive motor 311 and the wheel 14 of the electric vehicle; or if the electric vehicle performs boost charging on the power battery 12 through the second boost circuit 42, the switch module control signal S1 controls the second switch module K2 to be turned on, the first boost circuit 41 connects the charging pile 20 to the power battery 12, and in this case, the clutch apparatus control signal S2 controls the second clutch apparatus 323 to disconnect the connection between the second drive motor 321 and the wheel 14 of the electric vehicle. The controller provided in the embodiments outputs the switch module control signal S1 and the clutch apparatus control signal S2, so that when the power system 30 performs boost charging on the power battery 12, the transmission connection between the drive motor and the wheel 14 of the electric vehicle can be disconnected. Therefore, this can avoid vibration and shake of the electric vehicle caused by a torque generated by the drive motor after boost charging ends, and can improve comfort of the electric vehicle 10.

In an embodiment, maximum operating power of the first boost circuit 41 is the same as that of the second boost circuit 42. When output power of charging pile is less than or equal to the maximum operating power of the first boost circuit 41 or the second boost circuit 42, the switch module control signal S1 controls either the switch module K1 or the switch module K2 to be turned on, and the clutch apparatus control signal S2 is used to control a clutch apparatus of a powertrain corresponding to the turned-on switch module to disconnect a transmission connection between a drive motor and at least one wheel 14.

In an embodiment, the maximum operating power of the first boost circuit 41 is less than the maximum operating power of the second boost circuit 42.

When the electric vehicle 10 is connected to the charging pile 20 to charge the power battery 12, in response to that the output power of the charging pile 20 is less than or equal to the maximum output power of the first boost circuit 41, the controller 50 is configured to control the first switch module K1 to be turned on and control the first clutch apparatus 313 to disconnect the connection between the first drive motor 311 and the wheel 14. For example, in response to that the output power of the charging pile 20 is less than or equal to the maximum output power of the first boost circuit 41, the controller 50 outputs the switch module control signal S1 and the clutch apparatus control signal S2, the switch module control signal S1 controls the first switch module K1 to be turned on, and the clutch apparatus control signal S2 controls the first clutch apparatus 313 to disconnect the transmission connection between the first drive motor 311 and the wheel 14.

When the electric vehicle 10 is connected to the charging pile 20 to charge the power battery 12, in response to that the output power of the charging pile 20 is greater than output power of the first boost circuit and less than or equal to output power of the second boost circuit, the controller 50 is configured to: control the first switch module K1 to be turned off, control the second switch module K2 to be turned on, and control the second clutch apparatus 323 to disconnect the connection between the second drive motor 321 and the wheel 14. For example, in response to that the output power of the charging pile 20 is less than or equal to the maximum output power of the first boost circuit 41, the controller 50 outputs the switch module control signal S1 and the clutch apparatus control signal S2, the switch module control signal S1 controls the first switch module K1 to be turned off and controls the second switch module K2 to be turned on, and the clutch apparatus control signal S2 controls the second clutch apparatus 323 to disconnect the connection between the second drive motor 321 and the wheel 14, to eliminate a torque generated by the first drive motor 311 in a boost charging process.

When the electric vehicle 10 is connected to the charging pile 20 to charge the power battery 12, in response to that the output power of the charging pile 20 is greater than the maximum operating power of the second boost circuit 42 and the output power of the charging pile 20 is less than or equal to a sum of the maximum operating power of the first boost circuit 41 and the maximum operating power of the second boost circuit 42, the controller 50 is configured to: control the first switch module K1 to be turned on, control the second switch module K2 to be turned on, control the first clutch apparatus 313 to disconnect the transmission connection between the first drive motor 311 and the wheel 14, and control the second clutch apparatus 323 to disconnect the transmission connection between the second drive motor 321 and the wheel 14. For example, in response to that the output power of the charging pile 20 is greater than the maximum operating power of the second boost circuit 42 and the output power of the charging pile 20 is less than or equal to the sum of the maximum operating power of the first boost circuit 41 and the maximum operating power of the second boost circuit 42, the controller 50 outputs the switch module control signal S1 and the clutch apparatus control signal S2, the switch module control signal S1 controls the first switch module K1 to be turned on and controls the second switch module K2 to be turned on, and the clutch apparatus control signal S2 controls the first clutch apparatus 313 to disconnect the transmission connection between the first drive motor 311 and the wheel 14, and controls the second clutch apparatus 323 to disconnect the transmission connection between the second drive motor 321 and the wheel 14.

The controller 50 provided in embodiments is configured to output the switch module control signal and the clutch apparatus control signal based on a comparison relationship between the output power of the charging pile and the output power of the first boost circuit and the output power of the second boost circuit. The controller 50 provided in embodiments may select an appropriate boost manner when the electric vehicle performs boost charging, and disconnect a transmission connection between a drive motor corresponding to a boost circuit in a connected state and a wheel of the electric vehicle, to eliminate a torque generated by the drive motor on the wheel in a boost charging process. The controller 50 provided in embodiments improves safety of boost charging and comfort of the electric vehicle.

Implementations and embodiments are described above. The foregoing descriptions are examples, not exhaustive, and not limited to the foregoing implementations. Many modifications and variations are apparent to a person of ordinary skill in the art without departing from the scope and spirit of the described implementations. Selection of terms used are intended to best explain implementation principles, actual application, or improvements to technologies in the market, or to enable another person of ordinary skill in the art to understand the implementations and embodiments.

What is claimed is:

1. A power system of an electric vehicle, the power system comprises two powertrains, each powertrain comprises a clutch apparatus, a drive motor, and a motor control unit, the drive motor in each powertrain is in transmission connection with at least one wheel of the electric vehicle through the clutch apparatus, the drive motor and the motor control unit in each powertrain form a boost circuit,
    the boost circuit is configured to:
    receive power supplied by a charging pile and charge a power battery, a maximum output voltage of the boost circuit in each powertrain is greater than a maximum output voltage of the charging pile, and
    the power system is configured to:
    in response to the maximum output voltage of the charging pile being less than a minimum charging voltage of the power battery, control at least one of two boost circuits to operate, and control the clutch apparatus of the powertrain corresponding to the at least one operating boost circuit to disconnect the transmission connection between the drive motor and the at least one wheel.

2. The power system according to claim 1, wherein each powertrain comprises a transmission gear group, the transmission gear group is configured to be in transmission connection with the drive motor and the at least one wheel, and the clutch apparatus in each powertrain is configured to disconnect the transmission connection between the transmission gear group and the drive motor or the transmission connection between the transmission gear group and the at least one wheel.

3. The power system according to claim 1, wherein the two boost circuits have same maximum operating power, wherein
    in response to output power of the charging pile being less than or equal to the maximum operating power of the boost circuit, one boost circuit is in an operating state, the other boost circuit is in a disconnected state, and the boost circuit in the operating state is configured to charge the power battery after performing boost conversion on an output voltage of the charging pile; or
    in response to output power of the charging pile being greater than the maximum operating power of the boost circuit and the output power of the charging pile is less than or equal to a sum of the maximum operating power of the two boost circuits, both the boost circuits are in an operating state, and the two boost circuits are configured to charge the power battery after performing boost conversion on an output voltage of the charging pile.

4. The power system according to claim 1, wherein the two powertrains are, respectively, a first powertrain and a second powertrain, the first powertrain comprises a first drive motor, a first motor control unit, and a first clutch apparatus, the second powertrain comprises a second drive motor, a second motor control unit, and a second clutch apparatus, one end of each of three windings of the first drive motor is configured to connect to a bridge arm midpoint of each of three bridge arms of the first motor control unit, the end of each of the three windings of the first drive motor and one end of each of the three bridge arms of the first motor control unit form an input end of a first boost circuit, and two ends of each of the three bridge arms of the first motor control unit form an output end of the first boost circuit;
one end of each of three windings of the second drive motor is configured to connect to a bridge arm midpoint of each of three bridge arms of the second motor control unit, the end of each of the three windings of the second drive motor and one end of each of the three bridge arms of the second motor control unit form an input end of a second boost circuit, and two ends of each of the three bridge arms of the second motor control unit form an output end of the second boost circuit; and
the input ends of the first boost circuit and the second boost circuit are configured to connect to the charging pile, the output ends of the first boost circuit and the second boost circuit are configured to connect to the power battery, and maximum output power of the first boost circuit is less than maximum output power of the second boost circuit.

5. The power system according to claim 4, wherein, in response to output power of the charging pile being less than or equal to the maximum operating power of the first boost circuit, the first boost circuit is in an operating state, the second boost circuit is in a disconnected state, the first clutch apparatus disconnects a transmission connection between the first drive motor and the wheel, and the first boost circuit is configured to charge the power battery after performing boost conversion on an output voltage of the charging pile.

6. The power system according to claim 5, wherein, in response to the output power of the charging pile being greater than the maximum operating power of the first boost circuit and the output power of the charging pile being less than or equal to the maximum operating power of the second boost circuit, the first boost circuit is in a disconnected state, the second boost circuit is in an operating state, the second clutch apparatus disconnects a transmission connection between the second drive motor and the wheel, and the second boost circuit is configured to charge the power battery after performing boost conversion on the output voltage of the charging pile.

7. The power system according to claim 5, wherein the power system is further configured to:
in response to the output power of the charging pile being greater than the maximum operating power of the second boost circuit and the output power of the charging pile being less than or equal to a sum of the maximum operating power of the first boost circuit and the maximum operating power of the second boost circuit, the first boost circuit is in the operating state, the second boost circuit is in the operating state, the first clutch apparatus is configured to disconnect the transmission connection between the first drive motor and the wheel, the second clutch apparatus is configured to disconnect the transmission connection between the second drive motor and the wheel, and the first boost circuit and the second boost circuit are configured to charge the power battery after performing boost conversion on the output voltage of the charging pile.

8. The power system according to claim 4, wherein the power system comprises a first switch module and a second switch module, the output end of the first boost circuit is connected to the power battery through the first switch module, and the output end of the second boost circuit is connected to the power battery through the second switch module, wherein
when the first switch module is turned off, the first boost circuit is in a disconnected state, or
when the first switch module is turned on, the first boost circuit is in an operating state; and
when the second switch module is turned off, the second boost circuit is in a disconnected state, or
when the second switch module is turned on, the second boost circuit is in an operating state.

9. A controller for an electric vehicle, wherein the electric vehicle comprises two powertrains, each powertrain comprises a clutch apparatus, a drive motor, and a motor control unit, the drive motor in each powertrain is in transmission connection with at least one wheel of the electric vehicle through the clutch apparatus, the drive motor and the motor control unit in each powertrain form a boost circuit, the boost circuit is configured to:
receive power supplied by a charging pile, and charge a power battery of the electric vehicle through a switch module; and the controller is configured to:
in response to that a maximum output voltage of the charging pile is less than a minimum charging voltage of the power battery, output a switch module control signal and a clutch apparatus control signal, wherein the switch module control signal is used to control at least one of two switch modules to be turned on, and the clutch apparatus control signal is used to control the clutch apparatus of the powertrain corresponding to the turned-on switch module to disconnect the transmission connection between the drive motor and the at least one wheel.

10. The controller according to claim 9, wherein the two boost circuits have same maximum operating power, wherein
in response to output power of the charging pile being less than or equal to the maximum operating power of the boost circuit, the switch module control signal is used to control any switch module to be turned on, and the boost circuit corresponding to the turned-on switch module is configured to charge the power battery after performing boost conversion on an output voltage of the charging pile; or
in response to output power of the charging pile being greater than the maximum operating power of the boost circuit and the output power of the charging pile being less than or equal to a sum of the maximum operating power of the two boost circuits, the switch module control signal is used to control the two switch modules to be turned on, and the two boost circuits are configured to charge the power battery after performing boost conversion on an output voltage of the charging pile.

11. The controller according to claim 9, wherein the two powertrains are, respectively, a first powertrain and a second powertrain, the first powertrain comprises a first drive motor, a first motor control unit, a first clutch apparatus, and a first switch module, and the second powertrain comprises a second drive motor, a second motor control unit, a second clutch apparatus, and a second switch module;

the first drive motor and the first motor control unit form a first boost circuit, the second drive motor and the second motor control unit form a second boost circuit, and maximum operating power of the first boost circuit is less than maximum operating power of the second boost circuit; and the first boost circuit supplies power to the power battery through the first switch module, and the second boost circuit supplies power to the power battery through the second switch module.

12. The controller according to claim 11, wherein the controller is further configured to:

in response to output power of the charging pile being less than or equal to the maximum operating power of the first boost circuit, control the first switch module to be turned on and control the first clutch apparatus to disconnect the connection between the first drive motor and the wheel.

13. The controller according to claim 11, wherein the controller is further configured to:

in response to the output power of the charging pile being greater than the maximum operating power of the first boost circuit and is less than or equal to the maximum operating power of the second boost circuit, control the second switch module to be turned on and control the second clutch apparatus to disconnect the connection between the second drive motor and the wheel.

14. The controller according to claim 11, wherein the controller is further configured to:

in response to the output power of the charging pile being greater than the maximum operating power of the second boost circuit and the output power of the charging pile being less than or equal to a sum of the maximum operating power of the first boost circuit and the maximum operating power of the second boost circuit, control the first switch module and the second switch module to be turned on, control the first clutch apparatus to disconnect the connection between the first drive motor and the wheel, and control the second clutch apparatus to disconnect the connection between the second drive motor and the wheel.

15. An electric vehicle, the electric vehicle comprises a power system, wherein the power system comprises two powertrains, each powertrain comprises a clutch apparatus, a drive motor, and a motor control unit, the drive motor in each powertrain is in transmission connection with at least one wheel of the electric vehicle through the clutch apparatus, the drive motor and the motor control unit in each powertrain form a boost circuit, the boost circuit is configured to:

receive power supplied by a charging pile and charge a power battery, a maximum output voltage of the boost circuit in each powertrain is greater than a maximum output voltage of the charging pile, and the power system is configured to:

in response to the maximum output voltage of the charging pile being less than a minimum charging voltage of the power battery, control at least one of two boost circuits to operate, and control the clutch apparatus of the powertrain corresponding to the at least one operating boost circuit to disconnect the transmission connection between the drive motor and the at least one wheel.

16. The electric vehicle according to claim 15, wherein each powertrain comprises a transmission gear group, the transmission gear group is configured to be in transmission connection with the drive motor and the at least one wheel, and the clutch apparatus in each powertrain is configured to disconnect the transmission connection between the transmission gear group and the drive motor or the transmission connection between the transmission gear group and the at least one wheel.

17. The electric vehicle according to claim 15, wherein the two boost circuits have a same maximum operating power, wherein in response to output power of the charging pile being less than or equal to the maximum operating power of the boost circuit, one boost circuit is in an operating state, the other boost circuit is in a disconnected state, and the boost circuit in the operating state is configured to charge the power battery after performing boost conversion on an output voltage of the charging pile; or in response to output power of the charging pile being greater than the maximum operating power of the boost circuit and the output power of the charging pile is less than or equal to a sum of the maximum operating power of the two boost circuits, both the boost circuits are in an operating state, and the two boost circuits are configured to charge the power battery after performing boost conversion on an output voltage of the charging pile.

18. The electric vehicle according to claim 15, wherein the two powertrains are, respectively, a first powertrain and a second powertrain, the first powertrain comprises a first drive motor, a first motor control unit, and a first clutch apparatus, the second powertrain comprises a second drive motor, a second motor control unit, and a second clutch apparatus, one end of each of three windings of the first drive motor is configured to connect to a bridge arm midpoint of each of three bridge arms of the first motor control unit, the end of each of the three windings of the first drive motor and one end of each of the three bridge arms of the first motor control unit form an input end of a first boost circuit, and two ends of each of the three bridge arms of the first motor control unit form an output end of the first boost circuit;

one end of each of three windings of the second drive motor is configured to connect to a bridge arm midpoint of each of three bridge arms of the second motor control unit, the end of each of the three windings of the second drive motor and one end of each of the three bridge arms of the second motor control unit form an input end of a second boost circuit, and two ends of each of the three bridge arms of the second motor control unit form an output end of the second boost circuit; and the input ends of the first boost circuit and the second boost circuit are configured to connect to the charging pile, the output ends of the first boost circuit and the second boost circuit are configured to connect to the power battery, and maximum output power of the first boost circuit is less than maximum output power of the second boost circuit.

19. The electric vehicle according to claim 18, wherein, in response to output power of the charging pile being less than or equal to the maximum operating power of the first boost circuit, the first boost circuit is in an operating state, the second boost circuit is in a disconnected state, the first clutch apparatus disconnects a transmission connection between the first drive motor and the wheel, and the first boost circuit is configured to charge the power battery after performing boost conversion on an output voltage of the charging pile.

20. The electric vehicle according to claim 19, wherein, in response to the output power of the charging pile being greater than the maximum operating power of the first boost circuit and the output power of the charging pile is less than or equal to the maximum operating power of the second boost circuit, the first boost circuit is in a disconnected state, the second boost circuit is in an operating state, the second clutch apparatus disconnects a transmission connection between the second drive motor and the wheel, and the second boost circuit is configured to charge the power battery after performing boost conversion on the output voltage of the charging pile.

* * * * *